(12) United States Patent
Tanabe

(10) Patent No.: US 6,928,649 B2
(45) Date of Patent: Aug. 9, 2005

(54) METHOD OF ATTACHING A SENSOR TO A PICKUP HEAD AND PICKUP HEAD

(75) Inventor: Noritaka Tanabe, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 296 days.

(21) Appl. No.: 10/241,727

(22) Filed: Sep. 12, 2002

(65) Prior Publication Data

US 2003/0048741 A1 Mar. 13, 2003

(30) Foreign Application Priority Data

Sep. 13, 2001 (JP) .......................... 2001-277390

(51) Int. Cl.$^7$ .............................................. G11B 7/085
(52) U.S. Cl. ........................................................ 720/671
(58) Field of Search .......................... 720/671; 369/244, 369/300, 112.23, 47.12; 360/245.4; 156/154

(56) References Cited

U.S. PATENT DOCUMENTS 5,200,010 A * 4/1993 Funami et al. .............. 156/154
5,442,504 A * 8/1995 Nagase et al. ............ 360/245.4
2002/0172145 A1 * 11/2002 Fujita et al. ................ 369/300
2003/0123373 A1 * 7/2003 Sogawa .................. 369/112.23

FOREIGN PATENT DOCUMENTS

| JP | 60-69611 | 4/1985 |
|---|---|---|
| JP | 62-61033 U | 4/1987 |
| JP | 63-223702 | 9/1988 |

* cited by examiner

Primary Examiner—Tianjie Chen
(74) Attorney, Agent, or Firm—Morgan, Lewis & Bockius LLP

(57) ABSTRACT

A soft adhesive agent whose force occurring at the time of curing is small is applied between a rib and a PD, and after the curing of the soft adhesive agent, a hard adhesive agent whose force occurring at the time of curing is large is applied between the rib and a plate. Thus since a sensor portion is fixed to a main-body base with two kinds of adhesive agents including the soft adhesive agent and the hard adhesive agent, it is possible to suppress the positional offset of the sensor portion at the time of its attachment, and it is possible to sufficiently ensure reliability with respect to the temperature change as well.

7 Claims, 5 Drawing Sheets

METHOD OF ATTACHING A SENSOR TO A PICKUP HEAD AND PICKUP HEAD

BACKGROUND OF THE INVENTION

1. Field of the Invention

The present invention relates to a method of attaching a sensor to a pickup head for reading data recorded on an optical disk such as a CD or a DVD, as well as a pickup head with the sensor attached thereto by that method.

2. Description of the Related Art

Conventionally, a pickup head is known as a device for reading data recorded on an optical disk such as a CD or a DVD. As is known, the pickup head is so arranged that data recorded on the optical disk is read by applying light emitted from a light source (laser diode (LD)) to a data recorded surface of the optical disk and detecting the reflected light by a light receiving element (photodiode (PD)).

The light receiving element is attached such that the center of its light receiving surface and the focal point of a focusing lens for focusing the reflected light from the optical disk are aligned with each other. A general pickup head is not provided with an adjusting mechanism for adjusting the position of the light receiving element attached to a main body. The reason is that the provision of the adjusting mechanism causes the problems of the main body of the pickup head becoming large in size and the higher cost.

Accordingly, in the general pickup head, when the light receiving element is attached to the main body of the pickup head, the light receiving element is fixed to the main body with an adhesive agent in a state in which the center of the light receiving surface and the focal position are aligned with each other.

Techniques for fixing an optical part to a main body with an adhesive agent are disclosed in, for example, JP-A-62-61033, JP-A-60-69611, and JP-A-63-223702.

However, the following problems have been encountered in a case where the light receiving element is fixed to the main body with an adhesive agent whose tensile force occurring at the time of curing is small (hereafter, this adhesive agent will be referred to as a soft adhesive agent).

The soft adhesive agent after curing undergoes large expansion and contraction in accordance with the change in the ambient temperature, so that the position where the light receiving element is attached is likely to change. For this reason, there has been a problem in that the pickup head with the light receiving element attached to the main body with the soft adhesive agent does not excel in the reliability with respect to the change in the ambient temperature.

On the other hand, in a case where the light receiving element is fixed to the main body with an adhesive agent whose tensile force occurring at the time of curing is greater than that of the aforementioned soft adhesive agent (hereafter, this adhesive agent will be referred to as a hard adhesive agent), the hard adhesive agent after curing undergoes small expansion and contraction in accordance with the change in the ambient temperature, so that it is possible to sufficiently ensure the reliability with respect to the temperature change. However, since the tensile force occurring at the time of curing is large, there has been a problem in that the position of the light receiving element changes at the time of curing.

Thus the soft adhesive agent has an advantage in that the positional offset of the light receiving element is small at the time of curing (attachment), but its reliability with respect to the change in the ambient temperature is low, whereas the hard adhesive agent has an advantage in that high reliability can be obtained with respect to the change in the ambient temperature, but the positional offset of the light receiving element is large at the time of curing (attachment).

SUMMARY OF THE INVENTION

The object of the invention is to provide a method of attaching a sensor to a pickup head which makes it possible to suppress the positional offset of the sensor at the time of the curing of the adhesive agent, and affords high reliability with respect to the temperature change.

The method of attaching a sensor to a pickup head in accordance with the invention has the following arrangements to overcome the above-described problems.

(1) In a method of attaching a sensor to a pickup head for fixing the sensor to a main body of the pickup head with an adhesive agent, the sensor is positioned to an attaching position of the main body of the pickup head, a first adhesive agent whose force occurring at the time of curing is small is applied so as to temporarily fix the sensor to the main body of the pickup head, and after the curing of the first adhesive agent, a second adhesive agent whose force occurring at the time of curing is greater than that of the first adhesive agent is applied so as to finally fix the sensor to the main body of the pickup head.

In this method, since the sensor (light receiving element) is temporarily fixed to the main body of the pickup head with the first adhesive agent whose tensile force occurring at the time of curing is small, it is possible to sufficiently suppress the positional offset of the sensor at the time of the curing (attachment) of the first adhesive agent. In addition, after the curing of the first adhesive agent, the second adhesive agent whose tensile force occurring at the time of curing is greater than that of the first adhesive agent is applied to fix the pickup head. Although the tensile force of the second adhesive agent occurring at the time of curing is large, since the sensor has already been temporarily fixed by the first adhesive agent, the positional offset of the sensor due to the tensile force occurring at the time of the curing of the second adhesive agent is suppressed, so that the sensor can be attached with high accuracy.

In addition, since the sensor is fixed to the main body by applying the second adhesive agent, it is possible to suppress the positional change of the sensor accompanying the expansion or contraction of the first adhesive agent with respect to the temperature change. Accordingly, it is possible to sufficiently ensure reliability with respect to the change in the ambient temperature.

The first adhesive agent referred to herein is an adhesive agent whose content of glass filler as its component is small or which contains no glass filler, and the second adhesive agent referred to herein is an adhesive agent whose content of glass filler as its component is large (larger than that of the first adhesive agent).

(2) A light receiving element of the sensor is disposed between two opposing ribs provided at a sensor attaching position of the main body of the pickup head, the first adhesive agent is applied between an inner side of each of the ribs and the light receiving element, and the second adhesive agent is applied between an outer side of each of the ribs and a plate to which the light receiving element is attached.

In this method, the light receiving element of the sensor is disposed between the opposing ribs provided on the main body, and the first adhesive agent is applied between the inner side of each of the ribs and the light receiving element. Since the light receiving element is fixed to the main body by the first adhesive agent, it is possible to suppress the positional offset of the light receiving element at the time of the curing of the first adhesive agent.

In addition, the second adhesive agent is applied on the outer sides of the ribs between the outer side of each of the ribs and the plate to which the light receiving element is attached, thereby fixing the plate to the main body. Since the plate is fixed to the main body by the second adhesive agent, it is possible to suppress the positional change of the plate accompanying the change in the ambient temperature, with the result that it is possible to suppress the positional change of the light receiving element attached to the plate. Consequently, it is possible to sufficiently ensure reliability with respect to the change in the ambient temperature.

In addition, as for the aforementioned sensor, one which is difficult to be deformed in the process of attaching the sensor is suitable, and one whose material is, for example, stainless steel is suitable.

DETAILED DESCRIPTION OF THE PREFERRED EMBODIMENTS

Figure 1:
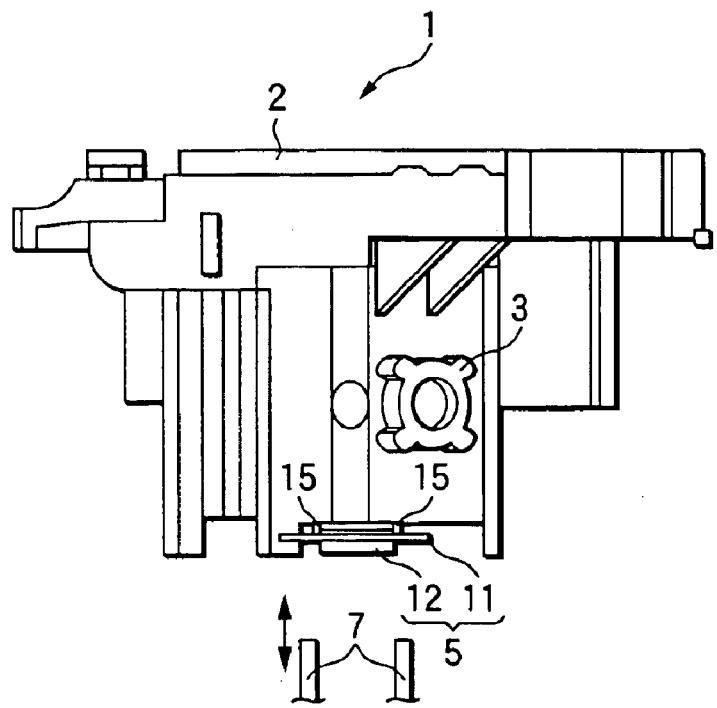
FIG. 1 is a side view of a pickup head in accordance with an embodiment of the invention.
Figure 2:
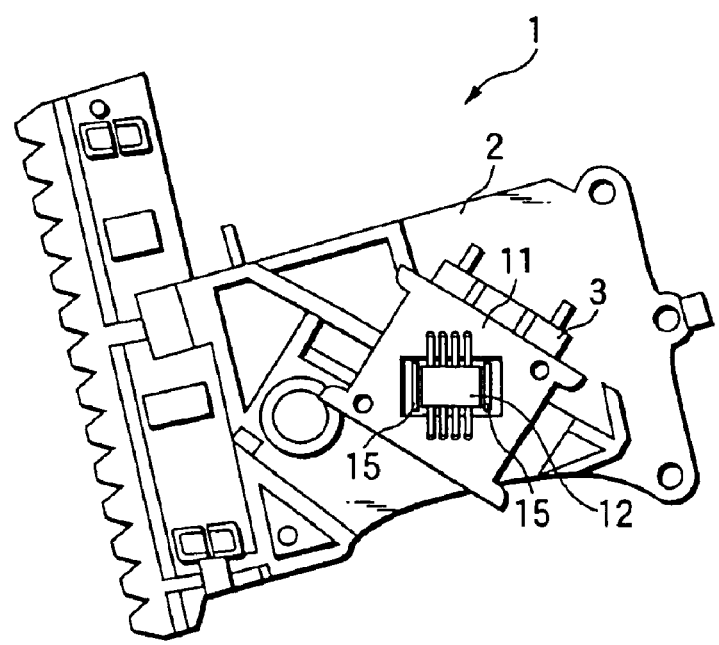
FIG. 2 is a bottom view of the pickup head in accordance with the embodiment of the invention.

FIG. 1 is a side view of a pickup head in accordance with an embodiment of the invention, and FIG. 2 is a bottom view of the pickup head.

In a pickup head 1 in this embodiment, a laser diode 3 (hereafter referred to as the LD 3), which is a light emitting element, is disposed on a side surface of a main-body base 2. In addition, a sensor portion 5 having a photodiode 12 (hereafter referred to as the PD 12), which is a light receiving element, is attached to a bottom surface of the main-body base 2.

Figure 3A:
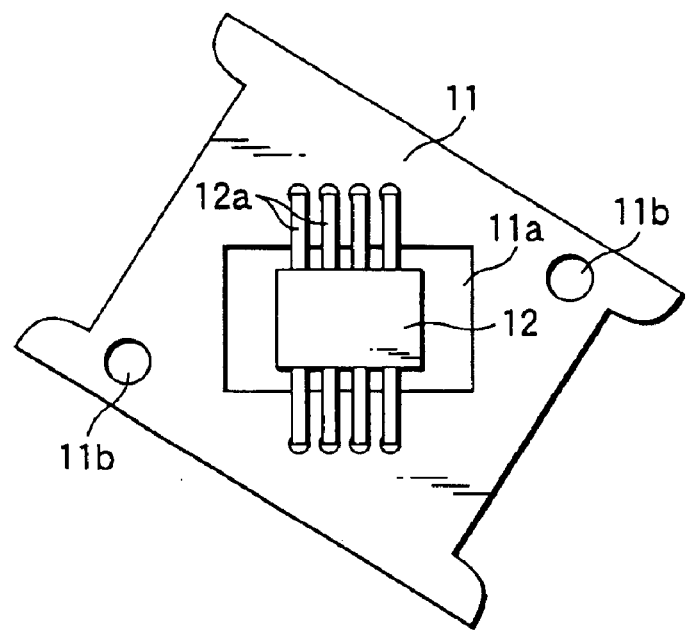
FIGS. 3A and 3B are diagrams illustrating a sensor portion of the pickup head in accordance with the embodiment of the invention.
Figure 3B:
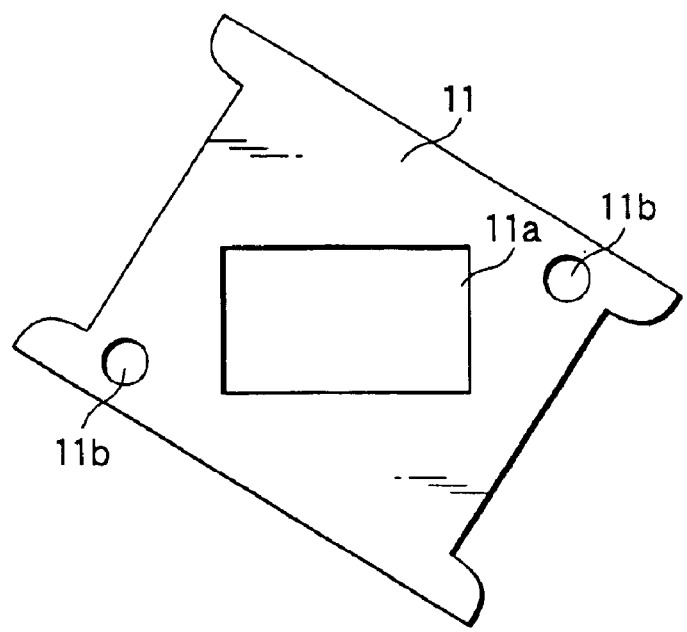

FIGS. 3A and 3B are schematic diagrams illustrating the sensor portion. The sensor portion 5 is arranged such that a PD 12 is attached to a plate 11 made of stainless steel. The plate 11 has an opening 11a in its central portion, as shown in FIG. 3B. The PD 12 is fixed to the plate 11 so as to be positioned at the center of the opening 11a by soldering PD's pins (leads) 12a to the plate 11, for example. Two positioning holes 11b are formed in the plate 11.

Further, two opposing ribs 15 are formed on the bottom surface of the main-body base 2. The interval between inner sides of these two opposing ribs 15 is slightly longer than the length of the PD 12. In addition, the interval between outer sides of the two opposing ribs 15 is slightly shorter than the length of the opening 11a formed in the plate 11.

When the two ribs 15 formed on the bottom surface of the main-body base 2 are inserted in the opening 11a of the plate 11, the PD 12 is located between the opposing ribs 15. The positioning of the PD 12 is effected in this state, and the sensor portion 5 is fixed to the main-body base 2 with an adhesive agent. The positioning of the PD 12 is effected by using an jig 7 shown in FIG. 1.

Figure 4:
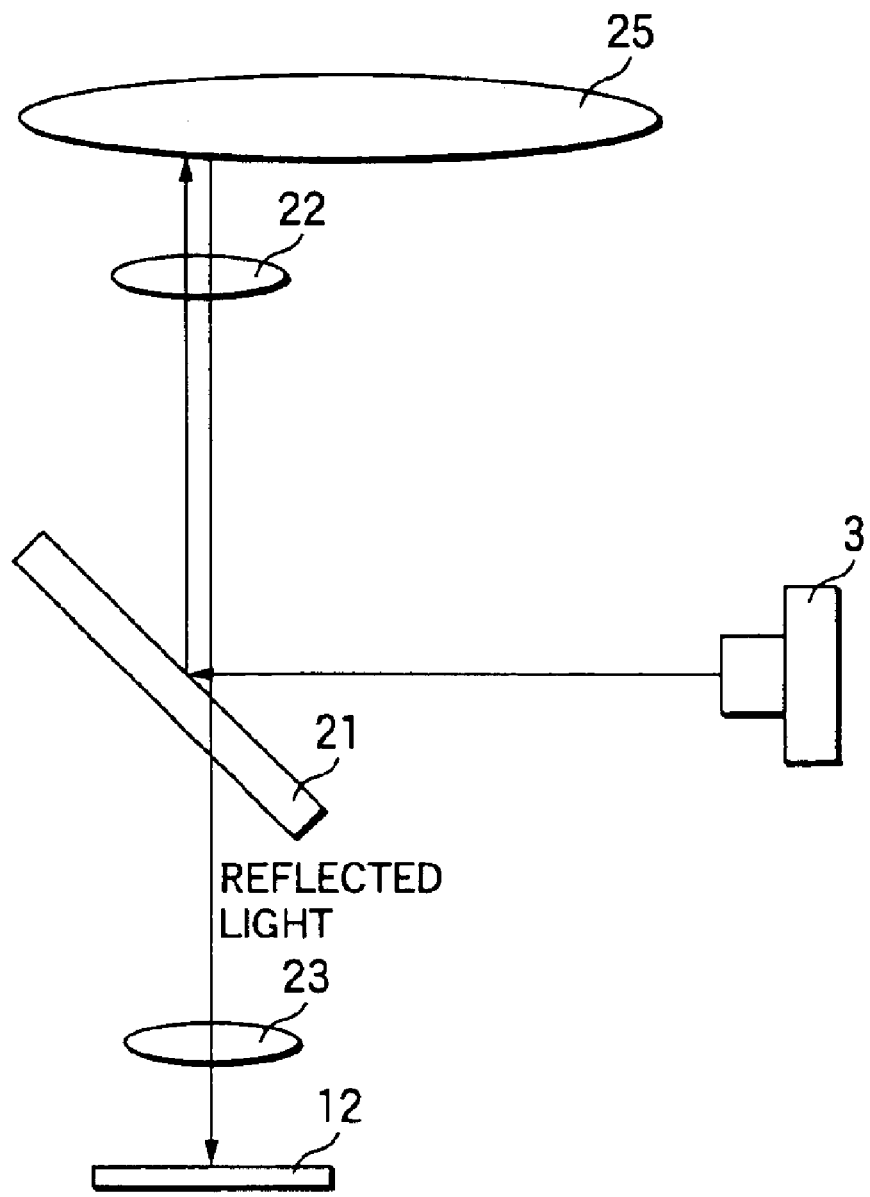
FIG. 4 is a diagram illustrating the configuration of optical parts in the pickup head in accordance with the embodiment of the invention.

It should be noted that disposed inside the main-body base 2 are a beam splitter 21 for bending the light emitted from the LD 3 upwardly in FIGS. 1 and 4, a first focusing lens 22 for focusing the light bent by the beam splitter 21 onto a recorded surface of an optical disk 25, and a second focusing lens 23 for focusing the light reflected by the recorded surface of the optical disk 25 and transmitted through the first focusing lens 22 and the beam splitter 21 (see FIG. 4).

The positioning of the PD 12 using the aforementioned jig 7 is the operation of positioning the sensor portion 5 with respect to three perpendicular directions of X, Y, and Z such that the focal position of the second focusing lens 23 and the center of the light receiving surface of the PD 12 are aligned.

Figure 5A:
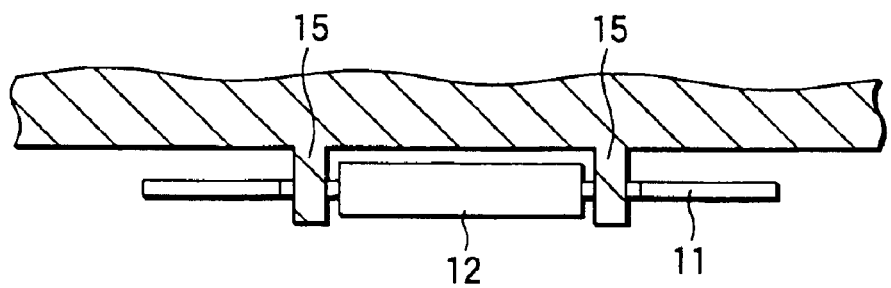
FIGS. 5A to 5D are diagrams explaining the method of attaching a sensor in a pickup head in accordance with the embodiment of the invention.
Figure 5B:
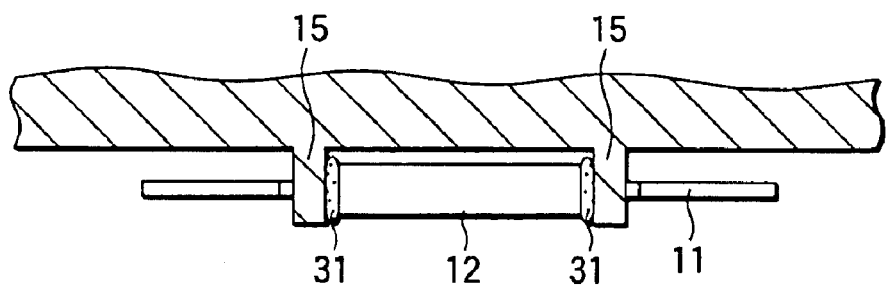
Figure 5C:
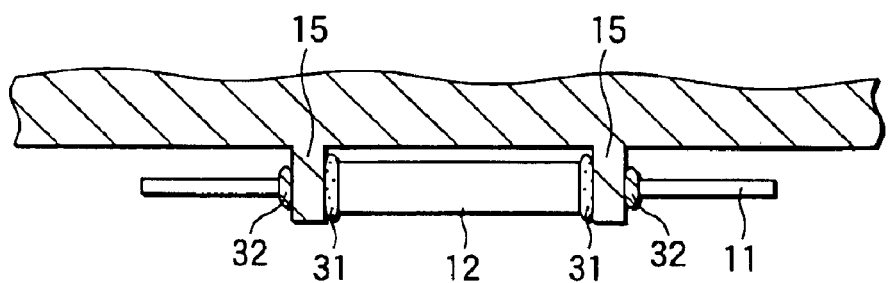

Hereafter, a detailed description will be given of the attaching method for fixing the sensor portion 5 to them a in-body base 2 with an adhesive agent. FIGS. 5A to 5C are diagrams illustrating this method.

Firstly, jig 7 is inserted into the positioning hole 11b of the plate 11 and the position where the sensor portion 5 is attached to the main-body base 2 is adjusted. Specifically, the attaching position of the sensor portion 5 is adjusted such that the focal position of the second focusing lens 23 and the center of the light receiving surface of the PD 12 are aligned. This adjustment is effected by using the jig 7. At this time, as shown in FIG. 5A, the PD 12 is located between the two opposing ribs 15 formed on the bottom surface of the main-body base 2, and the two opposing ribs 15 are inserted in the opening 11a of the plate 11.

As described above, the interval between the inner sides of the two ribs 15 is slightly longer than the length of the PD 12, and the interval between the outer sides of the two ribs 15 is slightly shorter than the length of the opening 11a formed in the plate 11. As for the sensor portion 5, the position of the PD 12 with respect to the main-body base 2 can be changed concerning the three perpendicular directions of X, Y, and Z, and the focal position of the second focusing lens 23 and the center of the light receiving surface of the PD 12 are aligned.

In addition, since stainless steel is used as the material of the plate 11 making up a part of the sensor portion 5, the plate 11 does not become deformed by the force acting at the time of adjustment, and the positioning of the attaching position can be effected with high accuracy.

Figure 5D:
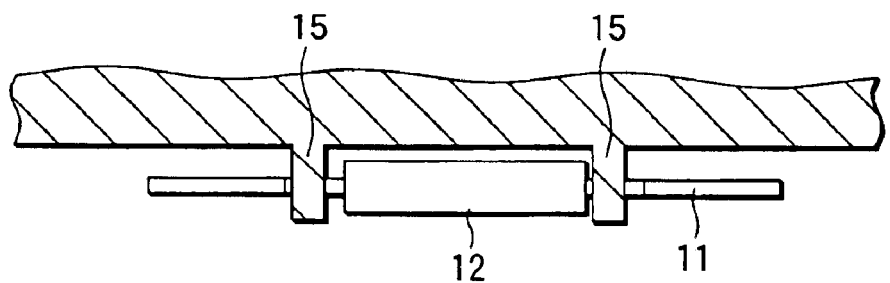

As shown in FIG. 5D, there is a case in which the PD 12 is not positioned at the center between the ribs 15 when the focal position of the second focusing lens 23 and the center of the light receiving surface of the PD 12 are aligned. Even in this case, the positional offset of the PD 12 at the time of the curing of the adhesive agent is suppressed by the following procedures.

Upon completion of the positioning of the sensor portion 5, an adhesive agent 31 whose tensile force (expanding or contracting force) occurring at the time of curing is small (hereafter, this adhesive agent will be referred to as the soft adhesive agent 31) is applied between the inner side surface of each rib 15 and the PD 12, and the soft adhesive agent 31 is allowed to cure (see FIG. 5B). The soft adhesive agent 31 is an adhesive agent whose content of glass filler as its component is small or which contains no glass filler. At this time, the sensor portion 5 is held at the position adjusted by the jig 7. In addition, since the tensile force of the soft adhesive agent 31 occurring at the time of curing is small, the position of the sensor portion 5 practically does not offset from the adjusted position at the time of the curing of the soft adhesive agent 31 applied between the inner side surface of each rib 15 and the PD 12.

Accordingly, since the position of the sensor portion 5 after the curing of the soft adhesive agent 31 practically does not change from the aforementioned adjusted position, the accuracy with which the sensor portion 5 is attached is excellent. As the jig 7, it is unnecessary to use an expensive one. Preferably, hardness of the soft adhesive agent 31 is not more than shore hardness D75. As the soft adhesive agent 31, LCR0639 (produced by TOAGOUSEI CO., LTD.; shore hardness D61) can be used, for example. The soft adhesive agent 31 takes, for example, 5 to 20 seconds to be cured by irradiating ultraviolet light.

When the soft adhesive agent 31 is cured, the jig 7 is removed. At this time, the sensor portion 5 is temporarily fixed to the main-body base 2 by the soft adhesive agent 31. It should be noted that the temporary fixation referred to herein is not such fixation that the position changes when a small force is applied. By the temporary fixation, the position of the sensor portion 5 does not change insofar as a relatively large force is applied.

Next, an adhesive agent 32 whose tensile force occurring at the time of curing is stronger than that of the soft adhesive agent 31 (hereafter referred to as the hard adhesive agent 32) is applied between the outer side surface of each rib 15 and the plate 11, and the hard adhesive agent 32 is allowed to cure (see FIG. 5C). The hard adhesive agent 32 is an adhesive agent whose content of glass filler as its component is large (i.e., an adhesive agent which contains a greater amount of glass filler than the soft adhesive agent 31). As this hard adhesive agent 32 cures, the sensor portion 5 is finally fixed to the main-body base 2, and the attaching operation is thereby completed. Preferably, hardness of the hard adhesive agent 32 is not less than shore hardness D80. As the hard adhesive agent 32, X-8803SS (produced by kyoriz CO., LTD.; shore hardness D84) can be used, for example. The hard adhesive agent 32 takes, for example, 20 to 60 seconds to be cured by irradiating ultraviolet light.

Although a larger tensile force than that of the soft adhesive agent 31 occurs at the time of the curing of the hard adhesive agent 32, since the sensor portion 5 has already been fixed to the main-body base 2 by the soft adhesive agent 31, the sensor portion's position does not offset from the adjusted position by the tensile force occurring when the hard adhesive agent 32 cures.

As for the sensor portion 5 which is finally fixed to the main-body base 2 by the above-described method, even if the soft adhesive agent 31 expands or contracts with respect to the change in the ambient temperature, since the hard adhesive agent 32 fixes the sensor portion 5 to the main-body base 2, the position of the sensor portion 5 does not change.

Accordingly, the pickup head 1 with the sensor portion 5 fixed to the main-body base 2 by the above-described method is capable of sufficiently ensuring reliability with respect to the change in the ambient temperature.

Figure 6:
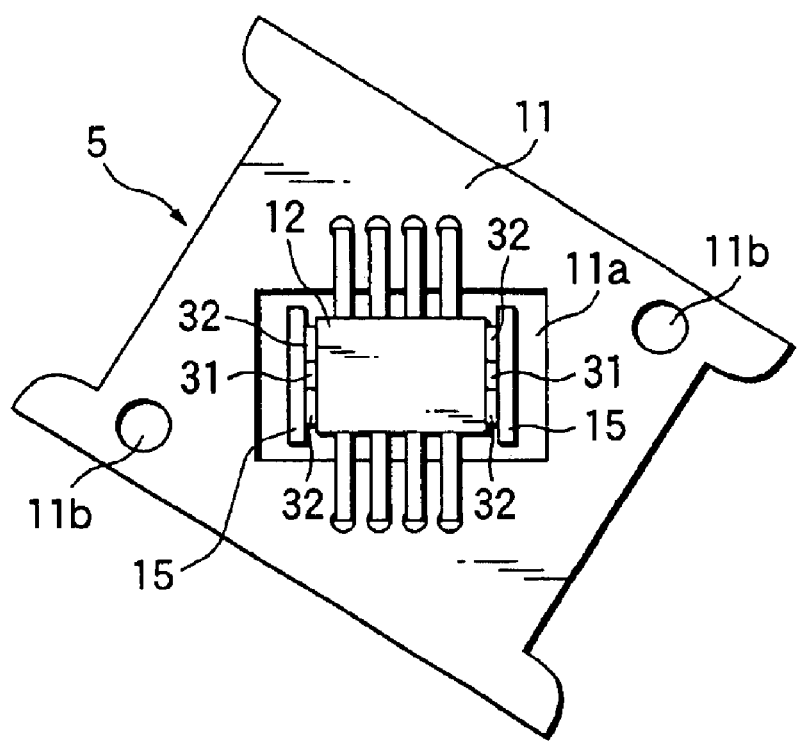
FIG. 6 is a bottom view of a pickup head in accordance with another embodiment of the invention.

FIG. 6 shows a bottom portion of a pickup head in accordance with another embodiment of the invention. A PD 12 is attached to a plate 11 made of stainless steel. The PD 12 is fixed to the plate 11 so as to be positioned at the center of an opening 11a by soldering PD's pins (leads) 12a to the plate 11, for example.

Two opposing ribs 15 are formed on the bottom surface of the main-body base. The interval between inner sides of these two opposing ribs 15 is slightly longer than the length of the PD 12. In addition, the interval between outer sides of the two opposing ribs 15 is slightly shorter than the length of the opening 11a formed in the plate 11.

Firstly, jig 7 shown in FIG. 1 is inserted into the positioning hole 11b of the plate 11 and the position where the sensor portion 5 is attached to the main-body base is adjusted.

When the two ribs 15 formed on the bottom surface of the main-body base are inserted in the opening 11a of the plate 11, the PD 12 is located between the opposing ribs 15.

Upon completion of the positioning of the sensor portion 5, a soft adhesive agent 31 is applied between the inner side surface of each rib 15 and the PD 12. The soft adhesive agent 31 is applied at a center point of each rib 15. At this time, the sensor portion 5 is held at the position adjusted by the jig 7.

When the soft adhesive agent 31 is cured, the jig 7 is removed. At this time, the sensor portion 5 is temporarily fixed to the main-body base by the soft adhesive agent 31.

Next, a hard adhesive agent 32 is applied between the inner side surface of each rib 15 and PD 12. The hard adhesive agent 32 is applied to both sides of the soft adhesive agent 31.

In the above-described embodiments, the jig 7 is removed when the soft adhesive agent 31 is cured. The jig 7 may be removed after the hard adhesive agent 32 is applied or after the hard adhesive agent 32 is cured.

As described above, since the sensor is fixed to the main body of the pickup head with two kinds of adhesive agents including the first adhesive agent whose tensile force occurring at the time of curing is small and the second adhesive agent whose tensile force occurring at the time of curing is greater than that of the first adhesive agent, it is possible to suppress the positional offset of the sensor at the time of its attachment, and it is possible to sufficiently ensure reliability with respect to the temperature change as well.

What is claimed is:

1. A method of attaching a sensor to a pickup head for fixing the sensor to a main body of the pickup head with an adhesive agent, comprising:

disposing a light receiving element of the sensor between two opposing ribs provided at an attaching position of the main body;

applying a first adhesive agent whose force occurring at the time of curing is small between an inner side of each of the ribs and the light receiving element so as to temporarily fix the sensor to the main body of the pickup head; and after the curing of the first adhesive agent, applying a second adhesive agent whose force occurring at the time of curing is greater than that of the first adhesive agent between an outer side of each of the ribs and a plate to which the light receiving element is attached and whose material is stainless steel, so as to finally fix the sensor to the main body of the pickup head.

2. A method of attaching a sensor to a pickup head according to claim 1, wherein the first adhesive agent is an ultraviolet curable adhesive whose hardness is not more than shore hardness D75, the second adhesive agent is an ultraviolet curable adhesive whose hardness is not less than shore hardness D75.

3. A method of attaching a sensor to a pickup head for fixing the sensor to a main body of the pickup head with an adhesive agent, comprising:

positioning the sensor to an attaching position of the main body;

applying a first adhesive agent whose force occurring at the time of curing is small so as to temporarily fix the sensor to the main body of the pickup head; and after the curing of the first adhesive agent, applying a second adhesive agent whose force occurring at the time of curing is greater than that of the first adhesive agent so as to finally fix the sensor to the main body of the pickup head, wherein a light receiving element of the sensor is disposed between two opposing ribs provided at a sensor attaching position of the main body of the pickup head, the first adhesive agent is applied between an inner side of each of the ribs and the light receiving element, and the second adhesive agent is applied between an outer side of each of the ribs and a plate to which the light receiving element is attached.

4. A method of attaching a sensor to a pickup head for fixing the sensor to a main body of the pickup head with an adhesive agent, comprising:

positioning the sensor to an attaching position of the main body;

applying a first adhesive agent whose force occurring at the time of curing is small so as to temporarily fix the sensor to the main body of the pickup head; and after the curing of the first adhesive agent, applying a second adhesive agent whose force occurring at the time of curing is greater than that of the first adhesive agent so as to finally fix the sensor to the main body of the pickup head, wherein a light receiving element of the sensor is disposed between two opposing ribs provided at a sensor attaching position of the main body of the pickup head, the first adhesive agent is applied between an inner side of each of the ribs and the light receiving element, and the second adhesive agent is applied between an outer side of each of the ribs and a plate to which the light receiving element is attached, wherein the material of the plate is stainless steel.

5. A pickup head comprising:

a main body;

a sensor attached to the main body;

two opposing ribs formed on the main body at a position where the sensor is attached, wherein the sensor includes a plate having an opening capable of allowing the two ribs to be inserted therein; and light receiving element attached substantially to a center of the opening, wherein a first adhesive agent whose force occurring at the time of curing is small is applied between an inner side of each of the ribs and the light receiving element, and a second adhesive agent whose force occurring at the time of curing is greater than that of the first adhesive agent is applied between an outer side of each of the ribs and the plate, so as to fix the sensor to the main body.

6. A pickup head according to claim 5, herein the first adhesive agent is an ultraviolet curable adhesive whose hardness is not more than shore hardness D75, the second adhesive agent is an ultraviolet curable adhesive whose hardness is not less than shore hardness D75.

7. A pickup head comprising:

a main body;

a sensor attached to the main body;

two opposing ribs formed on the main body at a position where the sensor is attached, wherein the sensor includes a plate having an opening capable of allowing the two ribs to be inserted therein; and light receiving element attached substantially to a center of the opening, wherein a first adhesive agent whose force occurring at the time of curing is small and a second adhesive agent whose force occurring at the time of curing is greater than that of the first adhesive agent are applied between an inner side of each of the ribs and the light receiving element, so as to fix the sensor to the main body.

* * * * *